United States Patent
Hawkins et al.

(10) Patent No.: US 12,421,935 B2
(45) Date of Patent: Sep. 23, 2025

(54) LOW-WIND RIDE-THROUGH OF A WIND TURBINE

(71) Applicant: Siemens Gamesa Renewable Energy A/S, Brande (DK)

(72) Inventors: Samuel Hawkins, Vejle (DK); Dennis Stachniuk Jensen, Brande (DK)

(73) Assignee: Siemens Gamesa Renewable Energy A/S, Brande (DK)

( * ) Notice: Subject to any disclaimer, the term of this patent is extended or adjusted under 35 U.S.C. 154(b) by 0 days.

(21) Appl. No.: 18/835,074

(22) PCT Filed: Jan. 16, 2023

(86) PCT No.: PCT/EP2023/050811
§ 371 (c)(1),
(2) Date: Aug. 1, 2024

(87) PCT Pub. No.: WO2023/151895
PCT Pub. Date: Aug. 17, 2023

(65) Prior Publication Data
US 2025/0163885 A1    May 22, 2025

(30) Foreign Application Priority Data
Feb. 8, 2022   (EP) .................................. 22155605

(51) Int. Cl.
*F03D 7/02*   (2006.01)
*F03D 9/11*   (2016.01)

(52) U.S. Cl.
CPC ......... *F03D 7/0264* (2013.01); *F03D 7/0272* (2013.01); *F03D 9/11* (2016.05)

(58) Field of Classification Search
CPC ......... F03D 7/0264; F03D 9/11; F03D 7/0272
See application file for complete search history.

(56) References Cited

U.S. PATENT DOCUMENTS

2008/0054641 A1   3/2008  Voss
2012/0056425 A1   3/2012  Cousineau
2022/0393477 A1*  12/2022 Zhao ...................... H02J 3/381

FOREIGN PATENT DOCUMENTS

DE    102009017244 A1   10/2010

OTHER PUBLICATIONS

Siemens AG Samuel Hawkins DK Brande et al: "Method of Operating a Wind Turbine"; Prior Art Publishing GMBH, Prior Art Publishing GMBH, Manfred-Von-Richthofen-STR. 9, 12101 Berlin Germany; vol. www.priorartregister.com, Jul. 31, 2019 (Jul. 31, 2019), pp. 1-6, XP007022694.

(Continued)

*Primary Examiner* — Viet P Nguyen
(74) *Attorney, Agent, or Firm* — Schmeiser, Olsen & Watts, LLP

(57) ABSTRACT

A method of controlling a wind turbine is provided including a generator system, an energy storage system and auxiliary equipment, the method including, in particular during a low wind condition: controlling the generator system in order to provide power from the generator system to the auxiliary equipment, in particular such that a rotor speed does not decrease; controlling the energy storage system in order to provide power from the energy storage system to the auxiliary equipment, if required to meet a power requirement of the auxiliary equipment; in particular keeping the wind turbine in operation.

16 Claims, 3 Drawing Sheets

(56) References Cited

OTHER PUBLICATIONS

Figure 1:
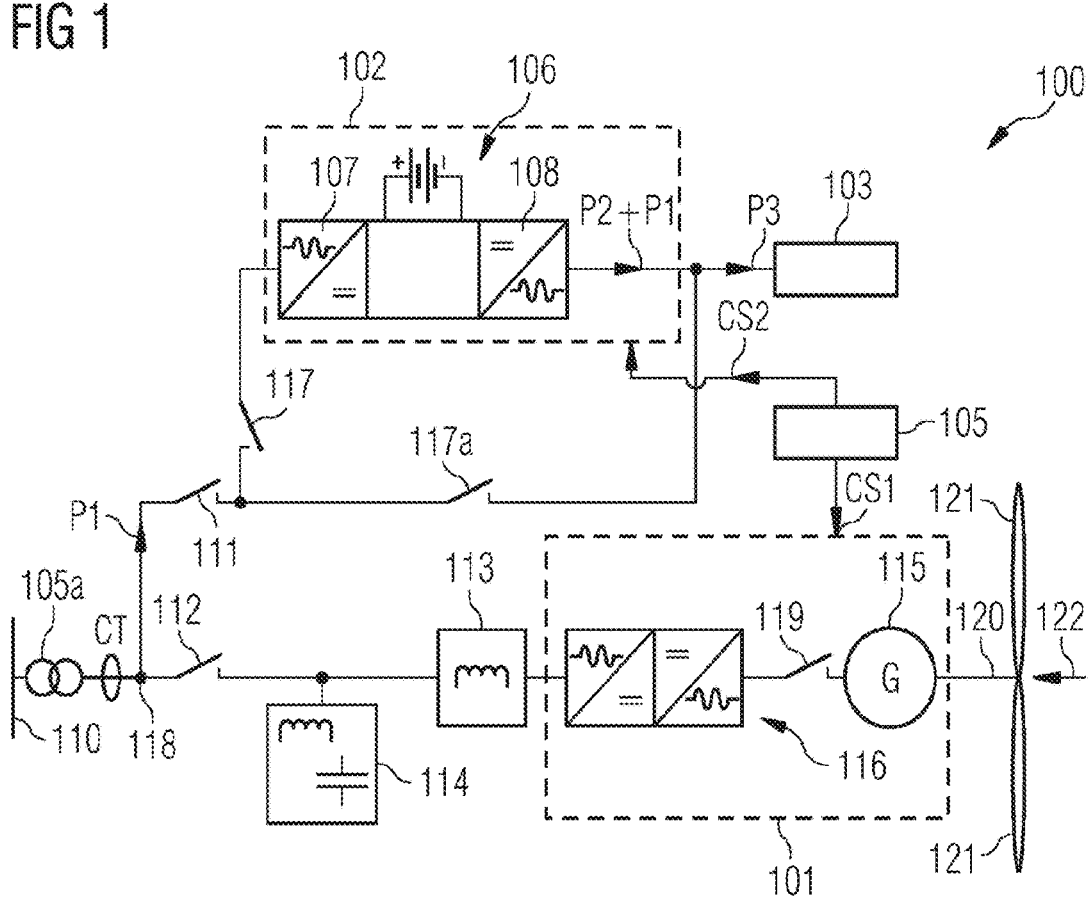

International Search Report & Written Opinion for PCT/EP2023/050811, mailed on Mar. 24, 2023.

* cited by examiner

LOW-WIND RIDE-THROUGH OF A WIND TURBINE

CROSS-REFERENCE TO RELATED APPLICATIONS

This application is a national stage of PCT Application No. PCT/EP2023/050811, having a filing date of Jan. 16, 2023, which claims priority to EP Application No. 22155605.3, having a filing date of Feb. 8, 2022, the entire contents both of which are hereby incorporated by reference.

FIELD OF TECHNOLOGY

The following relates to a method and a corresponding arrangement of controlling a wind turbine comprising a generator system, an energy storage system and auxiliary equipment in particular during a low-wind condition. Furthermore, the following relates to a wind turbine comprising the arrangement.

BACKGROUND

A conventional wind park comprising plural wind turbines converts wind power into rotational motion which is then converted into electrical power using a power conversion system. In a wind turbine, the power conversion system includes a wind turbine rotor having mounted thereon aerodynamic rotor blades, a transmission system or gearbox, a generator and transformers, as well as a power conditioning system which may include high power frequency converters. The electrical power generated by a wind park is then supplied to an electrical power grid or also referred to as utility grid from which plural consumers may receive electrical power.

Due to the design of the power conversion system and/or inefficiencies in the power conversion system, the power plant may not be able to produce power at all wind speeds. Typically, a wind park has a cut-in wind speed and/or cut-in rotor speed which may be the minimum required wind speed or rotor speed beyond of which the wind park or wind turbine can produce and deliver power to the electrical utility grid.

Modern wind turbines operate by converting moving wind into rotational motion which is then converted into electrical power using a power conversion system. This power conversion system will typically include the wind turbine rotor made up of aerodynamic rotor blades a rotating shaft, a transmission system or gearbox, a generator, and finally a power conditioning system which may include high power frequency converters. The electrical power generated is then fed into an electrical power grid or to an electrical consumer.

Power extracted from the wind turbine generator must always be balanced with the power the wind turbine's aerodynamic rotor extracts from the moving wind stream. At higher wind speeds, the rotor pitch system can regulate the amount of power extracted by the aerodynamic rotor, to avoid rotor acceleration when the generator is producing rated power. At lower wind speeds, the pitch system will be positioned for optimal wind energy extraction and less power may need be extracted from the generator or else the rotor will begin to decelerate.

Wind turbine generators and power conversion systems have a minimum rotor speed where power generation is possible. It is, therefore, necessary to reduce the power offtake from the generator at low wind speeds to maintain rotor speeds above this minimum "low-wind cut-out" rotor speed.

For wind turbines disconnected from an external grid supply, it is necessary to supply power consumers within the wind turbine by utilizing power produced by the wind turbine. This type of operation, often referred to as "island mode" or "self-sustained" operation, is useful in operating wind turbines not integrated into a grid network or temporarily disconnected from a grid network. The power consumers which must be supplied are referred to as auxiliary systems and include components such as pumps, fans, and motors as well as lights, heaters, control systems and communication systems. The power consumption of these systems can range from only a few watts to over 100 kilowatts or more, depending on the operational state and size of the individual wind turbine.

At low wind speeds, the electrical mechanical losses in the wind turbine's power conversion system combined with the power demanded by the auxiliary system may exceed momentarily what the aerodynamic rotor is capable of extracting from the moving wind stream. This can lead to the rotor speed decreasing below the low-wind cut-out rotor speed and the wind turbine ceasing power production. This may require the rotor to come to a standstill for safety purposes and for wind turbine systems to be shut down in order to conserve energy. Returning the wind turbine to operation later, when wind speeds increase, may require restarting of power conversion systems and rebuilding inertia in the rotor; leading to excessive use of time and energy.

It has been observed that conventional methods may include to shut-down the wind turbine during a low-wind condition. Thereby, power cannot be delivered to the utility grid and re-start of the wind turbine requires a considerable amount of time. Thus, there may be a need for a method and a corresponding arrangement of controlling the wind turbine in particular during a low-wind condition, wherein efficiency or performance of the wind turbine, in particular regarding power production, may be improved. In particular a solution may be needed to maintain operation of the wind turbine during island-mode or self-sustained operation to ensure that momentary imbalances in power production and power consumption at low wind speed do not result in excessive deceleration of the rotor speed.

SUMMARY

An aspect relates to a method of controlling a wind turbine comprising a generator system, an energy storage system and auxiliary equipment, the method comprising, in particular during a low wind condition: controlling the generator system in order to provide power from the generator system to the auxiliary equipment, in particular such that a rotor speed does not decrease; controlling the energy storage system in order to provide power from the energy storage system to the auxiliary equipment, if required to meet a power requirement of the auxiliary equipment; in particular keeping the wind turbine in operation.

In embodiments, the method may be implemented in software and/or hardware and/or may be performed by for example a wind turbine controller.

The wind turbine comprises a rotor at which plural rotor blades are connected, wherein the rotor is mechanically coupled to the generator system, in particular coupled to a generator comprised in the generator system. Upon rotation of the rotor, the generator produces electric energy, in particular AC electrical power, for example comprising three phases. The generator system may be configured for producing AC power which is, under normal conditions, e.g., during normal wind speed conditions, delivered to a utility grid.

The energy storage system is capable for storing energy in any of a mechanical/chemical/electrical form, and further may comprise one or more components in order to convert, if necessary, the energy into electrical energy, such as AC power, which is to be utilized for the auxiliary equipment.

The auxiliary equipment may comprise any components of the wind turbine which may be required to operate the wind turbine for power production and/or also for the case where the wind turbine needs to be re-started. The auxiliary equipment may require supply of AC power to be operable.

The low-wind condition may comprise a situation, wherein the prevailing wind speed, the wind turbine is subjected to, is relatively low, such as for example between 10 to 20% of a rated wind speed, at which the rotational speed of the rotor is at a rated operational speed and/or at which the power output of the generator system is at a rated power output for example. According to an embodiment of the present invention, the low-wind condition may be characterized in that the power as deliverable from the generator system is lower than a threshold or lower than the power required by the auxiliary equipment, for example.

In embodiments, the method may control the generator system and the energy storage system by providing particular control signals to the generator system, in particular a converter, and providing control signals to the energy storage system, in particular also a converter for example which may be configured as a DC/AC converter for example. Thus, in particular during the low-wind condition some power is provided from the generator system to the auxiliary equipment and some other power portion is provided from the energy storage system to the auxiliary equipment. Thereby, the wind turbine can be kept in operation without having to shut-down the wind turbine.

Conventionally, when the wind turbine approaches a situation where the rotor speed reaches a low-wind cut-out rotor speed, the wind turbine stops power production and is thereby shut-down. When the wind turbine is stopped, conventionally a Diesel generator or battery storage system may be activated in order to deliver the power needed for wind turbine auxiliary systems. However, the required re-start of the wind turbine is time-consuming and thereby hampers or decreases possible power output by the wind turbine.

According to an embodiment of the present invention, the wind turbine may be continued for operation, due to the supplement of required power to the auxiliary systems from the energy storage system. Thereby, the generator system may in particular be controlled such that the rotational speed substantially does not decrease due to the extraction of energy extracted from the generator system and supplied to the auxiliary equipment. The supplementing electrical power to the auxiliary system from the energy storage system can be prevailing over a particular time interval, such as between 10 seconds and 10 minutes for example. In this time period, the wind turbine can therefore be continued to be operated, without having to shut-down the wind turbine. When the wind speed increases after this time period, the generator system may at some point be capable of supplying the entire required power to the auxiliary system, without the need of additional supply to the auxiliary equipment from the energy storage system.

According to embodiments of the present invention, startup procedures, which may be time-consuming, may not be necessary during or after the low-wind situation is over.

According to an embodiment of the present invention, the method further comprises determining, in particular depending on and/or based on an actual rotor speed, a first amount of electrical power the generator system is capable of delivering; if the first amount of power is smaller than a third amount of power needed by the auxiliary equipment: providing substantially the first amount of power from the generator system to the auxiliary equipment; determining a second amount of power such that the sum of the first amount and the second amount of power substantially equals the third amount of power; providing the second amount of power from the energy storage system to the auxiliary equipment.

The first amount of electrical power the generator system is capable of delivering may be or correspond to the total power that may be extracted from the generator system (for example as a function of the wind turbine rotor speed) minus electrical losses and losses associated with power conversion. If more power than the first amount of power would be extracted from the generator system (including the rotor), the rotor would decelerate until it would reach a cut-out rotor speed. Thus, when only the first amount of electrical power is actually extracted from the generator system, the rotational speed of the rotor would not decelerate but would remain unchanged, when the external conditions, in particular wind speed, does not change.

The third amount of power is an amount of power which is required by the auxiliary equipment, in particular the amount of power which is required by the auxiliary equipment which is essential to keep the wind turbine in operation and for still enabling the generator system to produce electrical power (although the electrical power produced by the generator system not necessarily is supplied to the utility grid, but it may entirely be (or at least a portion thereof) delivered to the auxiliary equipment).

Thus, when the amount of power (i.e., the third amount of power) needed by the auxiliary equipment is greater than the first amount of power (i.e., the amount of power the generator system is capable of delivering, in particular without decreasing the rotational speed) then the first amount of power (or a portion thereof) may be provided from the generator system to the auxiliary equipment. The amount of power still available from the generator system, when already a portion of power (in particular the first amount of power) is delivered to the auxiliary system, may be referred to as a "rest amount" of power which may be greater than zero or may substantially be zero. Embodiments of the present invention may allow to reserve some rest amount of power which is greater than zero. Other embodiments do not reserve a rest amount of power such that the entire amount, i.e., the first amount of electrical power the generator system is capable of delivering, is in fact delivered towards the auxiliary equipment.

The second amount of power may represent the supplement power as provided from the energy storage system, in order to meet, together with the first amount of electrical power, the requirements of the auxiliary equipment amounting to the third amount of power.

Thereby, firstly, the power requirements of the auxiliary equipment may be met, and the wind turbine may be continued to be kept in operation without having to shut-down the wind turbine.

According to an embodiment of the present invention, the first amount power is determined to be limited such that the rotor speed does not decrease substantially, when the first amount is actually extracted from the generator system.

The first amount of power may in embodiments result in at least a slight deceleration of the rotor speed, when the first amount of power is actually extracted from the generator system. In an embodiment however, the first amount of power is determined, such as to allow continued operation of the rotor with a fixed or unchanging rotational speed (when the wind speed or external conditions are unchanged). When the first amount of power is limited in such a manner, embodiments of the method may be applied in a continued manner, for example during a considerable time interval, such as between 10 seconds and 10 minutes or even longer. Furthermore, a cut-out rotation speed may be avoided to be reached, thereby preventing shutting down the wind turbine.

According to an embodiment of the present invention, the first amount, the second amount and the third amount are subject to change over time depending on external and/or internal conditions and/or operating parameters; and/or the wind turbine is not shut-down unless the first amount is lower than a minimum active power threshold or equal to (or lower than) zero.

According to an embodiment of the present invention, the third amount of power, i.e., representing auxiliary equipment power requirements, may be set for example to a predetermined fixed power reserve value. This reserve value not necessary changes while performing embodiments of the method. In other embodiments, the first amount of power may be dynamically determined for example depending on operational conditions and/or operational parameters and also including considerations regarding priorities of different auxiliary equipment components.

The first amount, for example varies with changing external conditions, such as wind speed but also depending on the actual rotational speed. The second amount may dynamically for example be derived based on the first amount as well as on the third amount. In other embodiments, the second amount of power may be limited to be in a particular range, due to the capacitance or capability of the energy storage system. Operating parameters may for example include at least one of rotational speed, pitch angle settings, wind speed, electrical output properties of the generator system, charged state of the energy storage system and so forth.

The minimum active power threshold may amount to for example less than 5% or 1% of a rated power or may substantially be zero. Thereby, great flexibility may be provided.

According to an embodiment of the present invention, the method comprises, if the first amount of power is equal to or greater than the third amount power: providing the third amount of power from the generator system to the auxiliary equipment; and/or providing no power from the energy storage system to the auxiliary equipment.

If the first amount of power is equal to or greater than the third amount of power, supplementing electrical power from the energy storage system to the auxiliary equipment may not be necessary, since the generator system is capable of providing all the required power by the auxiliary system to the auxiliary system. In this situation, the energy storage system may further be recharged by providing some power generated by the generator system to the energy storage system. This embodiment may in particular be performed, if the low-wind condition is over and the wind speed has for example reached a wind speed between 70% and 150% of a rated wind speed, for example.

According to an embodiment of the present invention, the method comprises, if the first amount of power is smaller than a minimum active power threshold or is equal to or lower than zero, in particular for more than a predetermined time duration, the method further comprises at least one of: shutting down the wind turbine; disconnecting the wind turbine from the utility grid; providing no power from the generator system to the auxiliary equipment; providing the third amount of power from the energy storage system to the auxiliary equipment, wherein the minimum active power threshold is in particular substantially zero.

Thus, the wind turbine may for example be shut-down or disconnected from the utility grid when the generator system is not capable any more to outputting any power unless the rotational speed of the rotor would decrease. Thereby, the auxiliary equipment may still be operated by providing the third amount of power from the energy storage system to the auxiliary equipment. Thereby, quickly re-starting the wind turbine may be enabled.

According to an embodiment of the present invention, shutting down comprises at least one of: decreasing a rotational speed to zero; adjusting the pitch angles to a minimal lift position, in particular feather position; disconnecting the auxiliary equipment from the utility grid; disconnecting the generator system from the utility grid; disconnecting the energy storage system from the utility grid; disconnecting the wind turbine from the utility grid.

Thereby, a safe procedure may be provided to protect components of the wind turbines and also external components from damage.

According to an embodiment of the present invention, at least one of the following applies: the energy storage system is connectable or connected to the generator system, in particular via an auxiliary circuit breaker; the wind turbine and/or the auxiliary equipment is connected or disconnected and/or connectable or disconnectable from a utility grid.

The wind turbine may be connected or connectable to the grid via one or more circuit breakers. The circuit breakers may be located for example between the generator system and an optional wind turbine transformer which may be connectable to the utility grid, in particular via a point of common coupling to which plural rotor blades are connected. The auxiliary equipment as well as the energy storage system may be connected via an auxiliary circuit breaker for example to a connection node between the main circuit breaker and the wind turbine transformer. Further, a converter comprising the generator system may be connectable via a generator circuit breaker to a generator.

Thereby the required connections or disconnections may be achieved.

According to an embodiment of the present invention, the generator system includes, in particular connected in the listed order, at least one of: a generator, in particular permanent magnet synchronous generator; a converter; a reactor; a filter.

Thereby, a conventional system may be supported. The converter may for example comprise an AC/DC converter portion, a DC link and a DC/AC portion. The converter may be configured to convert a variable frequency AC power stream received from the generator to a substantially fixed frequency power stream which may subsequently be, in particular via the reactor and/or the harmonics filter supplied, in particular via the wind turbine transformer, to the utility grid.

According to an embodiment of the present invention, the low wind condition is characterized by at least one of: a wind speed deviates less than 20% or 10% from a minimum wind speed at which the wind turbine is still operable to produce power; the rotational speed of the rotor deviates less than 20% or 10% from a minimum rotational speed, in particular low-wind cut-out rotational speed, at which the wind turbine is still operable to produce power; at least one pitch angle is set for optimal power extraction from the wind.

The low-wind condition may last e.g., 10 s to 10 min longer to an on or more hours.

In conventional art, cut-out at low wind is typically happening at around 2.5 to 3.5 m/S, however, with very (very) low auxiliary consumption this could be as low as 0.5 m/s or whatever is needed to overcome mechanical friction in the drivetrain (bearings, gearboxes, etc).

For a permanent magnet generator (PMG) there may be no "minimum" rotor speed, and as long as there is some rotation there will be some amount of voltage present at the generator terminals. However, the turbine's "own consumption" (including consumption by auxiliaries) may be higher than what the generator can produce, and this is when cut-out may occur. The energy storage system can then negate that consumption allowing continued operation down to very low rotor speeds without having to import power.

Thereby, in embodiments the method is capable of handling frequently observed low-wind conditions and controlling the wind turbine in order to get over the low-wind condition while improving power production and/or performance.

According to an embodiment of the present invention, at least one of the following applies: the auxiliary equipment is connectable or connected to the energy storage system; the auxiliary equipment is connectable or connected to the generator system via the energy storage system and in particular further via a circuit breaker; and/or the auxiliary equipment is connectable or connected to the generator system not via the energy storage system and in particular further via a circuit breaker.

Thereby, flexibility regarding the connectivities of the different components is provided. For example, an inline energy storage system configuration or a line interactive energy storage system configuration may be provided which may be selected depending on the particular application.

According to an embodiment of the present invention, the energy storage system comprises a DC energy storage and a DC-AC converter, wherein controlling the energy storage system comprises controlling the DC-AC converter, wherein the energy storage system comprises in particular at least one of: a battery energy storage system; a hydrogen electrolysis system; a fuel cell system; a flywheel; a Diesel and/or petrol driven generator.

Thereby, plural different conventionally available energy storage components may be supported. Depending on the particular energy storage component used, the control of the energy storage system may be adapted.

According to an embodiment of the present invention, the auxiliary equipment comprises at least one of: a wind turbine auxiliary component; a pump; a fan; a motor; a yaw actuator for turning a rotor axis; a pitch actuator for a wind turbine blade; a cooling system component; a heater system component; an illumination system; a light component; a control system; a communication system.

Thereby, conventionally available or used auxiliary equipment may be supported. The auxiliary equipment may be selected such as to ensure that essential functions of the wind turbine are still operable.

It should be understood that features, individually or in any combination, disclosed, explained, provided or applied to a method of controlling a wind turbine, also, individually or in any combination, apply or can be performed for an arrangement for controlling a wind turbine, according to embodiments of the present invention and vice versa.

According to an embodiment of the present invention, it is provided an arrangement for controlling a wind turbine comprising a generator system, an energy storage system and auxiliary equipment, in particular during a low wind condition, the arrangement being adapted: to control the generator system in order to provide power from the generator system to the auxiliary equipment, in particular such that a rotor speed does not decrease; to control the energy storage system in order to provide power from the energy storage system to the auxiliary equipment, if required to meet a power requirement of the auxiliary equipment; in particular to keep the wind turbine in operation.

The arrangement may for example be a portion of a wind turbine controller. The arrangement may be configured to carry out or control a method of controlling a wind turbine according to an embodiment of the present invention.

According to an embodiment of the present invention, it is provided a wind turbine, comprising: a generator system; an energy storage system; auxiliary equipment; and an arrangement according to the preceding embodiment.

The aspects defined above, and further aspects of the present invention are apparent from the examples of embodiment to be described hereinafter and are explained with reference to the examples of embodiment. The invention will be described in more detail hereinafter with reference to examples of embodiment but to which the invention is not limited.

BRIEF DESCRIPTION

Figure 2:
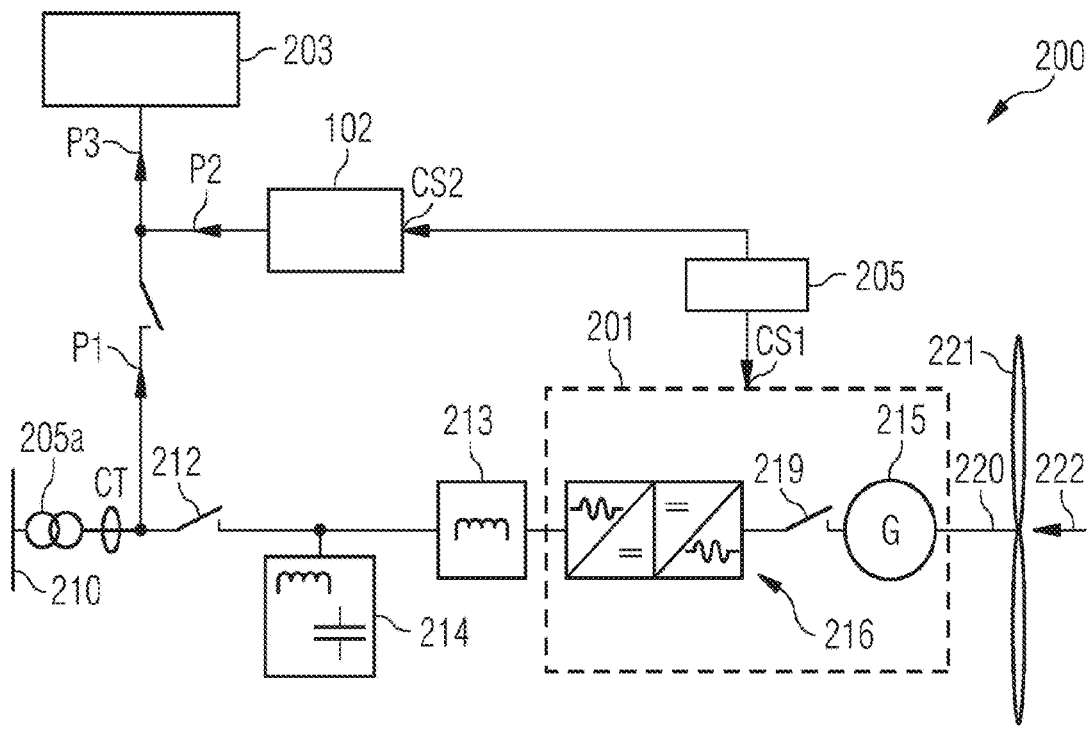
Figure 3:
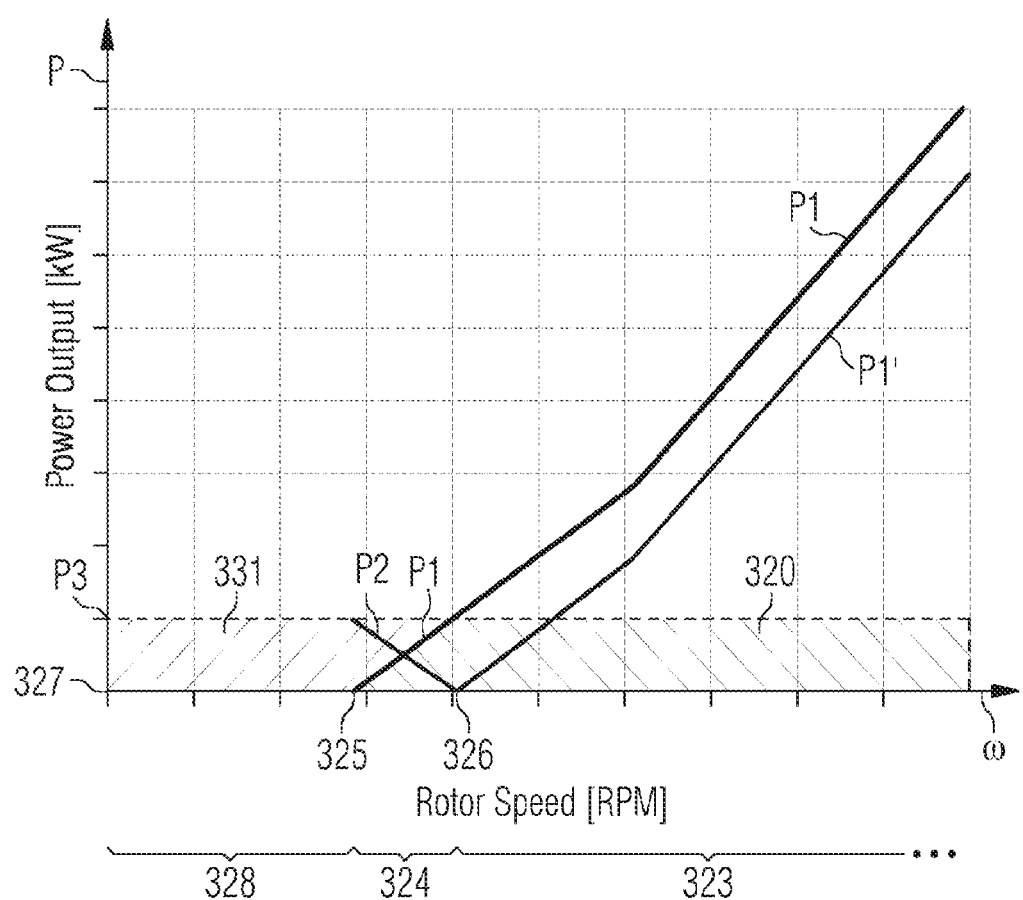
Figure 4:
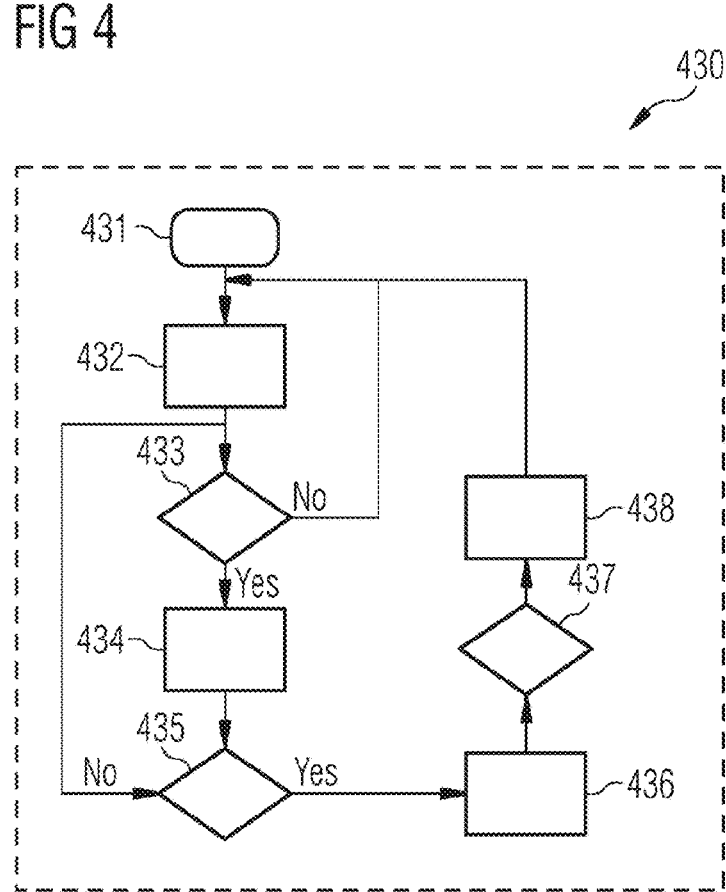
Figure 5:
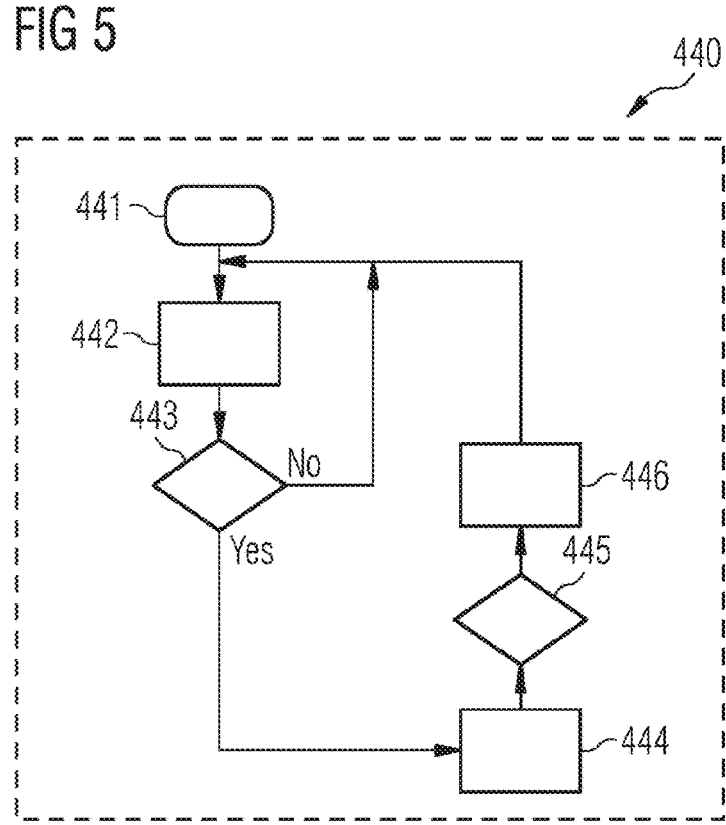

Some of the embodiments will be described in detail, with references to the following Figures, wherein like designations denote like members, wherein:

FIG. 1 schematically illustrates a wind turbine according to an embodiment of the present invention;

FIG. 2 schematically illustrates a wind turbine according to another embodiment of the present invention;

FIG. 3 illustrates power curves for explaining embodiments of the present invention;

FIG. 4 schematically illustrates a scheme of a method of controlling a wind turbine according to an embodiment of the present invention; and FIG. 5 illustrates a conventional control scheme.

DETAILED DESCRIPTION

The wind turbine 100 schematically illustrated in FIG. 1, according to an embodiment of the present invention, comprises a generator system 101, an energy storage system 102 and auxiliary equipment 103. Furthermore, the wind turbine 100 comprises an arrangement 105 for controlling a wind turbine according to an embodiment of the present invention.

The wind turbine 100 further comprises a rotor 120 which is mechanically coupled to the generator 115. At the rotor 120 plural rotor blades 121 are mounted. Wind 122 impacts on the rotor blades 121 and causes the rotor 120 to rotate.

The wind turbine 100 comprises a main circuit breaker 112 which connects the generator system 101 via a reactor 113 and a harmonics filter 104 to a wind turbine transformer 105a. The transformer 105a transforms the voltage output by the generator system 101 to a higher voltage and supplies the high-voltage AC power stream to the utility grid 110. The embodiment 100 of FIG. 1 comprises a further circuit breaker 117 (and bypass breaker 117a) between the energy storage system 102 and a node 118 which node 118 is between the main circuit breaker 112 and the wind turbine transformer 105a. The generator system 101 comprises a circuit breaker 119 between the generator 115 and the converter 116.

The generator system 101 comprises a generator 115 and an AC/DC, DC/AC converter 116. The reactor 113 and the harmonics filter, are optional components and may further be comprised within the generator system 101.

The arrangement 105 is adapted to control the generator system 101, in particular by providing a control signal cs1 to the generator system 101, in order to provide power P1 from the generator system 101 to the auxiliary equipment 103. The arrangement 105 is further configured to control the energy storage system 102, in particular by supplying a control signal cs2, in order to provide power P2 from the energy storage system 102 to the auxiliary equipment 103, if required to meet a power requirement, such as P3, of the auxiliary equipment 103.

The auxiliary equipment 103 may for example comprise auxiliary motors, controllers, etc. which may for example be essential for operating the wind turbine. Examples have been mentioned above.

The energy storage system 102 comprises a DC energy storage 106, an AC/DC converter 107 and/or a DC/AC converter 108, both converters 107, 108 being connected with their corresponding DC components to the energy storage 106. The AC/DC converter 107 is configured to convert an AC power stream, for example received from the generator system 101 or the utility grid 110 to a DC energy stream or power which is then supplied to the DC energy storage 106 for charging. The DC/AC converter 108 comprised in the energy storage system 102 is configured to convert the DC power received from the DC energy storage 106 to an AC power which can then be supplied to the auxiliary equipment 103.

The auxiliary equipment 103 is connectable, in particular by closing an auxiliary circuit breaker 111 (and breaker 117) to the generator system 101 via the energy storage system 102. Thus, when the auxiliary system 103 receives also power, such as P1, from the generator system 101, the power P1 flows through the energy storage system 102 and is provided or supplied additionally to the power P2 from the energy storage system 102 to the auxiliary equipment 103.

FIG. 2 schematically illustrates a wind turbine 200 according to another embodiment of the present invention. The wind turbine 200 is similar to the wind turbine 100 illustrated in FIG. 1. Therein, similar or same components or structures as in FIG. 1, are indicated with reference signs differing only in the first digit. A description of one component not explicitly explained with reference to a particular figure may be taken from the description of this corresponding element in another figure or embodiment.

As a difference to the embodiment 100 of the wind turbine illustrated in FIG. 1, the wind turbine 200 has the auxiliary equipment 203 connectable or connected to the generator system 201 not via the energy storage system 102.

FIG. 3 illustrates in a graph having an abscissa ω indicating the rotational speed of the rotor 120 of the wind turbine and having an ordinate P indicating the power output of the generator system, such as generator system 101 or 201 illustrated in FIG. 1 or 2.

The curve denoted by P1 presents a first amount of electrical power the generator system is capable of delivering, in particular without the rotational speed ω to decrease.

According to an embodiment of the present invention, the first amount of power P1 is determined for example depending or based on measurements or estimations or simulation of one or more operational parameters, such as current, voltage, rotational speed, frequency of the power stream or based on an actual power measurement. The curve P1' is the amount of power derived by subtracting a constant amount P3 from the power curve P1. Thereby, the power P3 may represent a third amount of power which is needed by auxiliary equipment, such as auxiliary equipment 103 or 203 illustrated in FIGS. 1 and 2, respectively. In the illustrated embodiment, the third amount P3 has been set to a fixed predetermined amount of power. In other embodiments, the third amount of power P3 may be subject to change in dependence on the actual requirements of the auxiliary equipment.

In the rotational speed regime 323 the first amount of power P1 is larger than the third amount of power P3. If in the rotational regime 323, the auxiliary equipment is exclusively supplied the third amount of power from the generator system. Further no power from the energy storage system is supplied to the auxiliary equipment.

In the rotational speed regime 324, the first amount of power P1 is equal or smaller than the third amount of power P3. In this rotational speed regime 324, substantially the first amount of power is provided from the generator system to the auxiliary equipment (see the curve denoted P1 within the regime 324 in FIG. 3). According to an embodiment of the present invention, in this rotational speed regime 324 a second amount P2 of power is determined such that the second amount of power P2 summed with the first amount of power P1 equals substantially to the third amount of power P3. This is illustrated as a curve denoted P2 in FIG. 3 in the rotational speed regime 324. The second amount of power P2 is then provided from the energy storage system, such as energy storage system 102 or 202 illustrated in FIG. 1 or 2, respectively, to the auxiliary equipment.

As a result, the wind turbine can still be operated within the rotational speed regime 324 up to or down to a cut-out rotational speed labelled as 325. Conventionally, the wind turbine is shut-down when the rotational speed is below a conventional cut-out rotational speed 326.

The first amount of power P1 illustrated in FIG. 3 is limited such that the rotor speed does not decrease substantially when the first amount of power is actually extracted from the generator system and provided to the auxiliary equipment.

The power labelled with reference sign 327 in FIG. 3 may correspond to a minimum active power threshold which may either be larger than zero or may substantially be zero.

In the rotational speed regime 328 being lower than the cut-out rotational speed 325, the auxiliary equipment is exclusively supplied with electric energy from the energy storage system. In this regime or even below the cut-out rotational speed value 325 the wind turbine may be shut-down.

FIG. 4 illustrates a method scheme 430 according to an embodiment of the present invention of controlling a wind turbine. In embodiments, the method starts at a method step 431. In a method step 432 the auxiliary equipment is supplied with power from the wind turbine, in particular the generator system, or the utility grid. In a decision element 433 it is evaluated whether the active power is smaller than the auxiliary power consumption. Thereby, the active power is in particular the total power that may be extracted from the generator as a function of the wind turbine rotor speed, minus electrical losses and losses associated with power conversion, thereby enabling that the rotational speed of the rotor stays unchanged.

If the evaluation in decision element 433 evaluates as true, it is branched to the method step 434. In method step 434 the power is supplied to the auxiliary equipment from the energy storage system in combination with the amount of available active power, i.e., the active power, which is available from the generator system, in particular without reducing the rotational speed of the rotor.

In a decision element 435 it is evaluated whether the active power (in particular which is then still available from the generator system even when supplying the available active power to the auxiliary system) is smaller than a minimum active power threshold. The minimum active power threshold may be substantially zero. If the evaluation in decision element 435 amounts to true, the wind turbine is shut-down in method step 436.

In a decision element 437 it is evaluated whether the wind speed has increased to be sufficient for re-start. If this is evaluated as true, the wind turbine is re-started in method step 438.

If the evaluation in decision element 433 evaluates as false, it is branched in a loop and it is returned to method step 432, wherein the auxiliary equipment is supplied with electrical energy by the wind turbine or the utility grid.

If the evaluation of decision element 435 evaluates as false, it is looped back to the decision element 433.

The "minimum active power threshold" may be a value close to or similar to zero kW. So, for example in a case where the auxiliary consumption is steady at a fixed value such as 40 kW, then when active power is less than 40 kw but greater than zero kW, the energy storage system is supplementing the supply of power to the auxiliaries and the turbine stays in operation. If the active power drops to zero kW, then the turbine would finally shut-down. It is noted that the active power may the power after internal transmission/conversion losses, for example, at the low-voltage side of 105a in FIG. 1 or 205a in FIG. 2.

FIG. 5 illustrates a conventional method scheme 440. In a method step 441 the method is started. In a step 442 auxiliary systems are supplied by the wind turbine or the grid. In a decision element 443 it is evaluated whether the active power available from the generator system is smaller than the auxiliary power consumption. If this evaluation results in true, the turbine is shut-down in method step 444. If the evaluation in decision element 443 evaluates as false, it is looped back to the method step 442. When it is determined in decision element 445 that the wind speed increased for sufficient wind speed to re-start, the turbine is re-started in method step 446.

The following features may be comprised in embodiments of the present invention, to which however embodiments of the invention are not restricted:

At low wind speeds there may only be a small amount of available power which can be extracted from the generator without causing a deceleration of the rotor. According to an embodiment of the present invention, a control function limits the power that is extracted from the generator for supplying the auxiliary system and energy storage system as a function of the rotor speed. Stored electricity in the energy storage system is then used to supplement the supply of power to the auxiliary power system. When the energy storage system is engaged, it is maintaining the auxiliary power consumption, meaning that power does not need to be extracted from the generator to fully cover this load to the auxiliaries.

With reference to FIG. 3, the curve labelled P1 shows the total power that may be extracted from the generator as a function of the wind turbine rotor speed, minus electrical losses and losses associated with power conversion. If more power is extracted, the rotor would decelerate until it reaches a cut-out rotor speed. Without an energy storage system, the power from the generator must also be used to cover the auxiliary system. The curve denoted P1' shows the amount of production that is possible after reserving for the auxiliary load. Where the curve labelled P1' reaches zero kW (at rotational speed 326) the wind turbine would conventionally cut-out and stop producing power as it can no longer sustain its own production (if grid-disconnected) or maintain a positive power output (if on-grid).

However, according to an embodiment of the present invention, with an energy storage system, as the rotor speed decreases below the limit where power extracted from the generator minus losses can no longer cover the auxiliary consumption, the power needed can be supplemented or entirely provided from the energy storage system. This allows power production to continue down to the rotor speed (325) where the curve P1 is zero kW. The shaded area 330 in FIG. 3 shows the power that is delivered from the generator system, after losses, while the other shaded area 331 shows the power that is delivered from the energy storage system.

In the method according to an embodiment of the present invention, the energy storage system gradually supplements the auxiliary supply as the rotor speed decreases. Thus, according to an embodiment of the present invention, the second amount P2 of power increases with increasing rotor speed. Further, according to an embodiment of the present invention, the first amount of power decreases with decreasing rotor speed.

Embodiments of the present invention may maintain the charge in the energy storage system and continuously operate down to even lower wind speeds than normal or conventionally, if the system is engaged, giving the aspect of low-wind ride-through capability.

Embodiments of the present invention are intended for use in grid-disconnected turbines or turbines with a power-limited grid connection. For fully on-grid wind turbines with an energy storage system, the low-wind ride-through functionality can however also be used when it is advantageous for example to maintain operation of the wind turbine. This might be beneficial in the cases of wind turbines with power conversion systems that take a long time to re-start once they cut-out or shut-down. To be able to ride-through a short-duration low-wind period could therefore be beneficial for an on-grid wind turbine as well as for an off-grid wind turbine.

According to an embodiment of the present invention, the energy storage system may be utilized to temporarily supplement the supply of the power needed by the auxiliary equipment. It may avoid or at least delay a shut-down of a wind turbine power production for too-low wind, when the wind speed is low only momentarily and keeps the turbine operating. This may have the advantage of avoiding delays associated with the re-starting a shut-down wind turbine once sufficient wind conditions return. For grid-disconnected wind turbines this may conserve energy and may allow for more continuous operation. For on-grid wind turbines this may improve energy production by avoiding delays and discontinuing and re-starting of power production. In a wind farm or individual wind turbines operating in an island mode or self-sustained operation mode, it is possible that they may be utilizing embodiments of the present invention. It may be possible to detect if the turbine is able to remain in operation at low wind speeds while energy is being drained from an energy storage system.

An embodiment of the present invention consists of a wind turbine, an electrical storage system, and an operational strategy which may be used to eliminate or offset the amount of power which is consumed from the wind turbine's power conversion system to provide power for a wind turbine's auxiliary systems. The electrical storage system may be integrated into the wind turbine's electrical system as shown in the two examples below.

In FIGS. 1 and 2, there is a wind turbine rotor, a generator and various electrical apparatus necessary for conditioning power for the electrical grid. The FIGS. 1 and 2 show a circuit for supplying power to an auxiliary system. This auxiliary system consists of the electrical consumers within the turbine. An energy storage system may be connected in such a way that it may provide power to the auxiliary network. FIG. 1 shows an inline variant where power for the auxiliary network may flow through the energy storage system. FIG. 2 shows a line-interactive variant where the energy storage system may supplement power flow.

In both examples shown in FIGS. 1 and 2, it is possible for the energy storage system to supply power to the auxiliary network while the auxiliary network is disconnected from the grid using an auxiliary circuit breaker.

The energy storage system may consist of a battery electric storage system, but other solutions may exist such as super capacitors, flywheels, hydrogen electrolysis and fuel cell systems or other energy storage systems. In the case of FIG. 2, the energy storage system may be comprised of a diesel or petrol generator (where the stored energy is in the form of diesel or petrol fuel). Other ways of connecting the energy storage system to the wind turbine's electrical system may also be used. The fundamental design element is that there is an energy storage system connected to the auxiliary network within the wind turbine.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method of controlling a wind turbine comprising a generator system, an energy storage system and auxiliary equipment, the method comprising, during a low-wind condition:
controlling the generator system in order to provide power from the generator system to the auxiliary equipment, such that a rotor speed does not decrease; and
controlling the energy storage system in order to provide power from the energy storage system to the auxiliary equipment, if required to meet a power requirement of the auxiliary equipment;
the controlling the generator system and controlling the energy storage system further comprising:
determining a first amount of electrical power the generator system is capable of delivering;
if the first amount of power is smaller than a third amount of power needed by the auxiliary equipment:
providing substantially the first amount of power from the generator system to the auxiliary equipment;
determining a second amount of power such that the sum of the first amount and the second amount of power substantially equals the third amount of power;
providing the second amount of power from the energy storage system to the auxiliary equipment,
wherein the first amount of power is determined to be limited such that the rotor speed of the rotor does not decrease substantially, when the first amount is actually extracted from the generator system,
wherein the low wind condition is when the rotational speed of the rotor deviates less than 20% from a minimum rotational speed.

2. The method according to claim 1, wherein the first amount of electrical power is determined depending on and/or based on an actual rotor speed.

3. The method according to claim 1, wherein at least one of the following applies:
the first amount, the second amount and the third amount are subject to change over time depending on external and/or internal conditions and/or operating parameters;
the wind turbine is not shut-down unless the first amount is lower than a minimum active power threshold or equal to or lower than zero.

4. The method according to claim 1, further comprising, if the first amount of power is equal to or greater than the third amount of power:
providing the third amount of power from the generator system to the auxiliary equipment; and/or
providing no power from the energy storage system to the auxiliary equipment.

5. The method according to claim 1, wherein, if the first amount of power is smaller than a minimum active power threshold or is equal to or lower than zero, for more than a predetermined time duration, the method further comprises at least one of:
shutting down the wind turbine;
disconnecting the wind turbine from the utility grid;
providing no power from the generator system to the auxiliary equipment;
providing the third amount of power from the energy storage system to the auxiliary equipment, wherein the minimum active power threshold is substantially zero.

6. The method according to claim 5, wherein shutting down comprises at least one of: decreasing a rotational speed to zero; adjusting the pitch angles to a minimal lift position, feather position; disconnecting the auxiliary equipment from the utility grid; disconnecting the generator system from the utility grid; disconnecting the energy storage system from the utility grid; disconnecting the wind turbine from the utility grid.

7. The method according to claim 1, wherein at least one of the following applies:
the energy storage system is connectable or connected to the generator system, via an auxiliary circuit breaker;
the wind turbine and/or the auxiliary equipment is connected or disconnected and/or connectable or disconnectable from a utility grid.

8. The method according to claim 1, wherein the generator system includes, connected in the listed order, at least one of:
a generator, permanent magnet synchronous generator;
a converter;
a reactor;
a filter.

9. The method according to claim 1, wherein the low wind condition further includes at least one of:

a wind speed deviates less than 20% or 10% from a minimum wind speed at which the wind turbine is still operable to produce power;
the rotational speed of the rotor deviates less than 10% from the minimum rotational speed;
at least one pitch angle is set for optimal power extraction from the wind.

10. The method according to claim 1, wherein at least one of the following applies:
the auxiliary equipment is connectable or connected to the energy storage system;
the auxiliary equipment is connectable or connected to the generator system via the energy storage system and further via a circuit breaker; and/or
the auxiliary equipment is connectable or connected to the generator system not via the energy storage system and further via a circuit breaker.

11. The method according to claim 1, wherein the energy storage system comprises a DC energy storage and at least one DC-AC converter, wherein controlling the energy storage system comprises controlling the DC-AC converter, wherein the energy storage system comprises at least one of:
a battery energy storage system;
a hydrogen electrolysis system;
a fuel cell system;
a flywheel;
a Diesel and/or petrol driven generator.

12. The method according to claim 1, wherein the auxiliary equipment comprises at least one of:
a wind turbine auxiliary component;
a pump;
a fan;
a motor;
a yaw actuator for turning a rotor axis;
a pitch actuator for a wind turbine blade;
a cooling system component;
a heater system component;
an illumination system;
a light component;
a control system;
a communication system.

13. The method of controlling a wind turbine of claim 1, wherein the step of controlling the energy storage system further comprising; keeping the wind turbine in operation; and wherein the minimum rotational speed, is a low-wind cut-out rotational speed, at which the wind turbine is still operable to produce power.

14. An arrangement for controlling a wind turbine comprising a generator system, an energy storage system and auxiliary equipment, during a low wind condition, the arrangement being configured:
to control the generator system in order to provide power from the generator system to the auxiliary equipment, such that a rotor speed does not decrease;
to control the energy storage system in order to provide power from the energy storage system to the auxiliary equipment, if required to meet a power requirement of the auxiliary equipment;
to determine a first amount of electrical power the generator system is capable of delivering;
if the first amount of power is smaller than a third amount of power needed by the auxiliary equipment:
to provide substantially the first amount of power from the generator system to the auxiliary equipment;
to determine a second amount of power such that the sum of the first amount and the second amount of power substantially equals the third amount of power;
to provide the second amount of power from the energy storage system to the auxiliary equipment,
wherein the first amount of power is determined to be limited such that the rotor speed of the rotor does not decrease substantially, when the first amount is actually extracted from the generator system,
wherein the low wind condition is wherein the rotational speed of the rotor deviates less than 20% from a minimum rotational speed.

15. The method of controlling a wind turbine of claim 14, wherein the control of the energy storage system further comprises; to keep the wind turbine in operation; and wherein the minimum rotational speed, is a low-wind cut-out rotational speed, at which the wind turbine is still operable to produce power.

16. A wind turbine, comprising:
a generator system;
an energy storage system;
auxiliary equipment; and
an arrangement according to claim 14.

* * * * *